US 6,536,853 B2

(12) United States Patent
Egle et al.

(10) Patent No.: US 6,536,853 B2
(45) Date of Patent: Mar. 25, 2003

(54) ARRANGEMENT FOR SUPPORTING A TRACK CHAIN OF A TRACK TYPE WORK MACHINE

(75) Inventors: Kevin M. Egle, Medford, WI (US); Michael D. Hasselbusch, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/839,774

(22) Filed: Apr. 20, 2001

(65) Prior Publication Data

US 2002/0153775 A1 Oct. 24, 2002

(51) Int. Cl.[7] .............................................. B62D 55/12
(52) U.S. Cl. .................... 305/195; 305/125; 305/199
(58) Field of Search ................................ 305/124, 125, 305/195, 196, 199, 110, 115

(56) References Cited

U.S. PATENT DOCUMENTS

| | | | | |
|---|---|---|---|---|
| 1,112,460 A | | 10/1914 | Leavitt | |
| 1,228,709 A | | 6/1917 | Stark | |
| 2,003,528 A | * | 6/1935 | Best | |
| 2,560,307 A | * | 7/1951 | Slemmons | |
| 3,567,294 A | * | 3/1971 | Simpson et al. | |
| 4,022,072 A | * | 5/1977 | Chagawa et al. | |
| 4,175,796 A | * | 11/1979 | Boggs et al. | 305/115 |
| 4,332,573 A | * | 6/1982 | Uchida et al. | 474/94 |
| 5,393,134 A | * | 2/1995 | Oertley | 305/195 |
| 5,697,683 A | * | 12/1997 | Arulandu et al. | 305/110 |
| 5,853,233 A | * | 12/1998 | Turner | 305/123 |
| 6,250,726 B1 | * | 6/2001 | Burdick et al. | 305/195 |

* cited by examiner

Primary Examiner—Russell D. Stormer
(74) Attorney, Agent, or Firm—Maginot, Addison & Moore; Calvin E Glastetter; Jeff A Greene

(57) ABSTRACT

An arrangement for supporting a track chain having a track link, a first bushing mechanically coupled to the track link, and a second bushing mechanically coupled to the track link. The first bushing has a first center point $C_1$ defined thereon. The second bushing has a second center point $C_2$ defined thereon. The first center point $C_1$ is spaced apart from the second center point $C_2$ by a distance $D_1$. The arrangement includes an idler wheel having a circumferentially extending surface defined thereon. The circumferentially extending surface has a first notch and a second notch defined therein. The first notch has a first wall portion. The first wall portion has a first point $P_1$ defined thereon at a first location. The second notch has a second wall portion. The second wall portion has a second point $P_2$ defined thereon at a second location which corresponds to the first location. The point $P_1$ is spaced apart from the point $P_2$ by a distance $D_2$.

20 Claims, 6 Drawing Sheets

ARRANGEMENT FOR SUPPORTING A TRACK CHAIN OF A TRACK TYPE WORK MACHINE

TECHNICAL FIELD

This invention relates generally to track assemblies for track type work machines and, more particularly, to an idler wheel for a track type work machine.

BACKGROUND

Conventional track chain assemblies utilized on track type work machines typically include a track chain comprised of a plurality of links that are interconnected by laterally disposed track pins. A track bushing is commonly disposed about the pin and is secured to the links for relative rotation with respect to the pin. The bushing is adapted to engage a drive sprocket that propels the track chain assembly about a frame and ultimately provides the tractive force necessary to power the work machine over the ground to perform various work functions with a work implement (e.g. a bucket or a blade).

The bushing is typically a "roller" bushing and is not fixed to the links but rather is allowed to rotate about the pin relative to both the pin and the links. This is done to reduce the wear between the sprocket and the bushings which is known to be quite severe, especially in the abrasive conditions in which track type work machines commonly operate.

Another source of wear on a track chain assembly occurs on the links of the track chain as a result of the interaction of the links with an idler wheel. In particular, the links commonly have a wear rail defined on an inwardly directed surface that engages wear surfaces defined on the idler wheel mounted on the frame. As the track chain rotates about the frame in the above-described manner, the wear rails of the links are continually brought into contact with the wear surface of the idler wheel and are thus subjected to severe wear. This severe wear is increased as a result of continually bringing the generally planar surface of the wear rails into contact with the arcuate idler wheel wear surface. The aforementioned contact results in an arcuate wear pattern being formed on the wear rails of the links. This wear decreases the "life" of the track chain assembly and thus increases the maintenance cost of the work machine.

As shown in U.S. Pat. Nos. 1,112,460 and 1,228,709 some track assemblies utilize components which have teeth extending therefrom which facilitate the cooperation between the track chain and these components. However, these assemblies also suffer from several drawbacks. For example, the components having the teeth extending therefrom are positioned outside of the links and therefore are subject to damage from elements (e.g. rocks) present in the work environment of the track chain assembly.

The present invention is directed to overcoming one or more of the problems or disadvantages associated with the prior art.

SUMMARY OF THE INVENTION

In accordance with one embodiment of the present invention, there is provided an arrangement for supporting a track chain having a track link, a first bushing mechanically coupled to the track link, and a second bushing mechanically coupled to the track link. The first bushing has a first center point $C_1$ defined thereon. The second bushing has a second center point $C_2$ defined thereon. The first center point $C_1$ is spaced apart from the second center point $C_2$ by a distance $D_1$. The arrangement includes an idler wheel having a circumferentially extending surface defined thereon. The circumferentially extending surface has a first notch and a second notch defined therein. The first notch has a first wall portion. The first wall portion has a first point $P_1$ defined thereon at a first location. The second notch has a second wall portion. The second wall portion has a second point $P_2$ defined thereon at a second location which corresponds to the first location. The point $P_1$ is spaced apart from the point $P_2$ by a distance $D_2$. The distance $D_1$ is greater than the distance $D_2$.

In accordance with another embodiment of the present invention there is provided a track chain assembly. The track chain assembly includes a track link. The assembly also includes a first bushing mechanically coupled to the track link. The first bushing has a first center point $C_1$ defined thereon. The assembly also includes a second bushing mechanically coupled to the track link. The second bushing has a second center point $C_2$ defined thereon. The first center point $C_1$ is spaced apart from the second center point $C_2$ by a distance $D_1$. The assembly further includes an idler wheel having a circumferentially extending surface defined thereon. The circumferentially extending surface has a first notch and a second notch defined therein. The first bushing is positioned within the first notch. The second bushing is positioned within the second notch. The first notch has a first wall portion. The first wall portion has a first point $P_1$ defined thereon at a first location. The second notch has a second wall portion. The second wall portion has a second point $P_2$ defined thereon at a second location which corresponds to the first location. The point $P_1$ is spaced apart from the point $P_2$ by a distance $D_2$. The distance $D_1$ is greater than the distance $D_2$.

In accordance with yet another embodiment of the present invention there is provided a track type work machine. The work machine includes a frame and a work implement mechanically coupled to the frame. The work machine also includes a track chain assembly mechanically coupled to the frame. The track chain assembly has (i) a track link, (ii) a first bushing mechanically coupled to the track link, the first bushing has a first center point $C_1$ defined thereon, (iii) a second bushing mechanically coupled to the track link, the second bushing has a second center point $C_2$ defined thereon, the first center point $C_1$ is spaced apart from the second center point $C_2$ by a distance $D_1$, and (iv) an idler wheel having a circumferentially extending surface defined thereon. The circumferentially extending surface has a first notch and a second notch defined therein. The first bushing is positioned within the first notch. The second bushing is positioned within the second notch. The first notch has a first wall portion. The first wall portion has a first point $P_1$ defined thereon at a first location. The second notch has a second wall portion. The second wall portion has a second point $P_2$ defined thereon at a second location which corresponds to the first location. The first point $P_1$ is spaced apart from the second point $P_2$ by a distance $D_2$. The distance $D_1$ is greater than the distance $D_2$.

DETAILED DESCRIPTION

Figure 1:
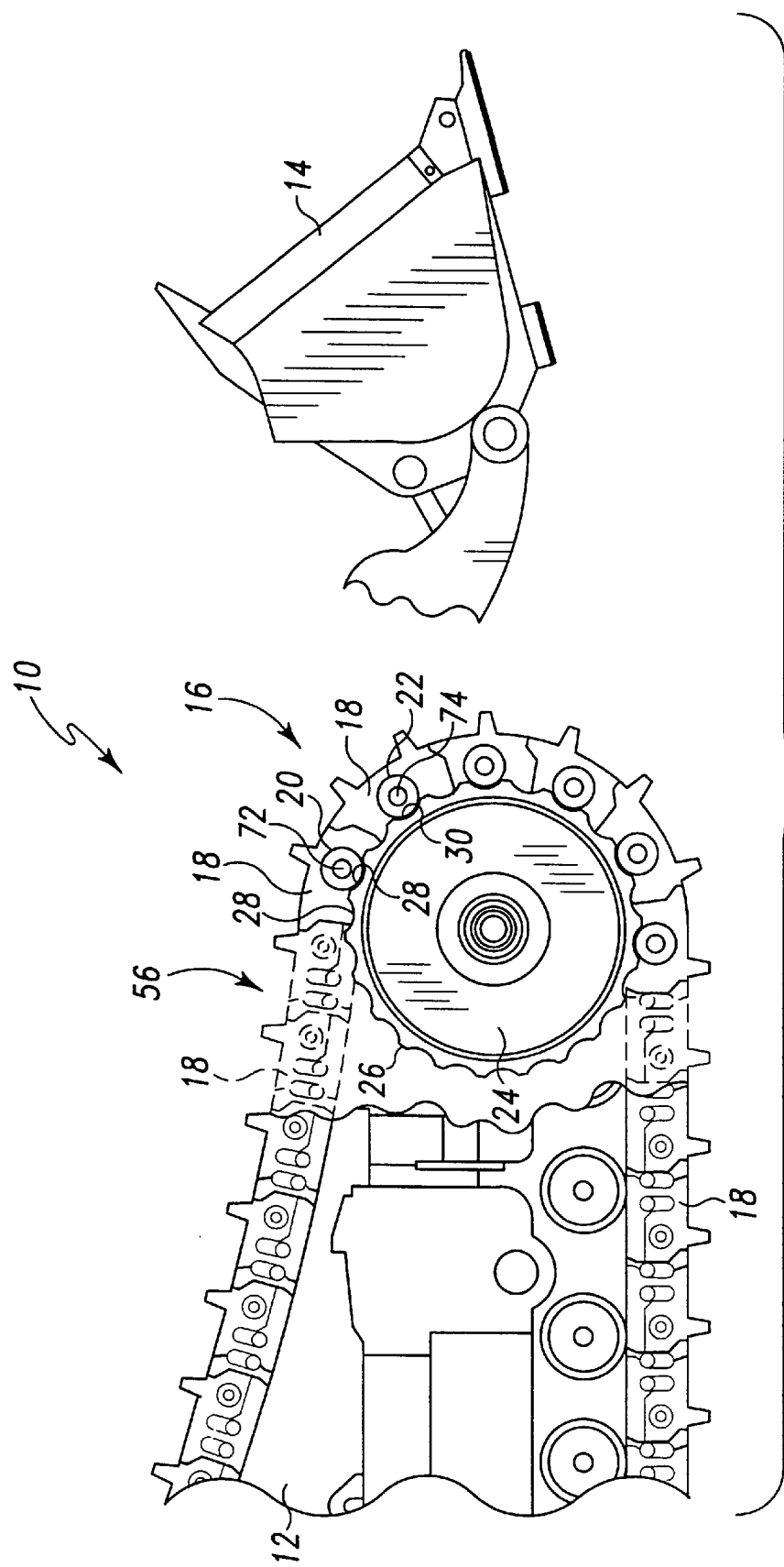
FIG. 1 is a fragmentary side elevational view of a work machine which incorporates the features of the present invention therein.

Referring now to FIG. 1. there is shown a portion of a track type work machine 10 which incorporates the features of the present invention therein. Work machine 10 includes a frame 12, a work implement 14, a track chain assembly 16, and a scraping device 50 (see FIG. 3). Work implement 14, track chain assembly 16, and scraping device 50 are all mechanically coupled to frame 12. Track chain assembly 16 includes (i) an idler wheel 24 mechanically coupled to frame 12 and (ii) a track chain 56 supported by idler wheel 24. It should be understood that idler wheel 24 engages, supports, and helps define a path of rotation for track chain 56 as work machine 10 is driven over the ground with a sprocket (not shown) in the above described manner in order to perform various work functions with implement 14. Work implement 14 is illustrated as a bucket in FIG. 1, however, it should also be understood that work implement 14 could alternatively be a blade.

Figure 2:
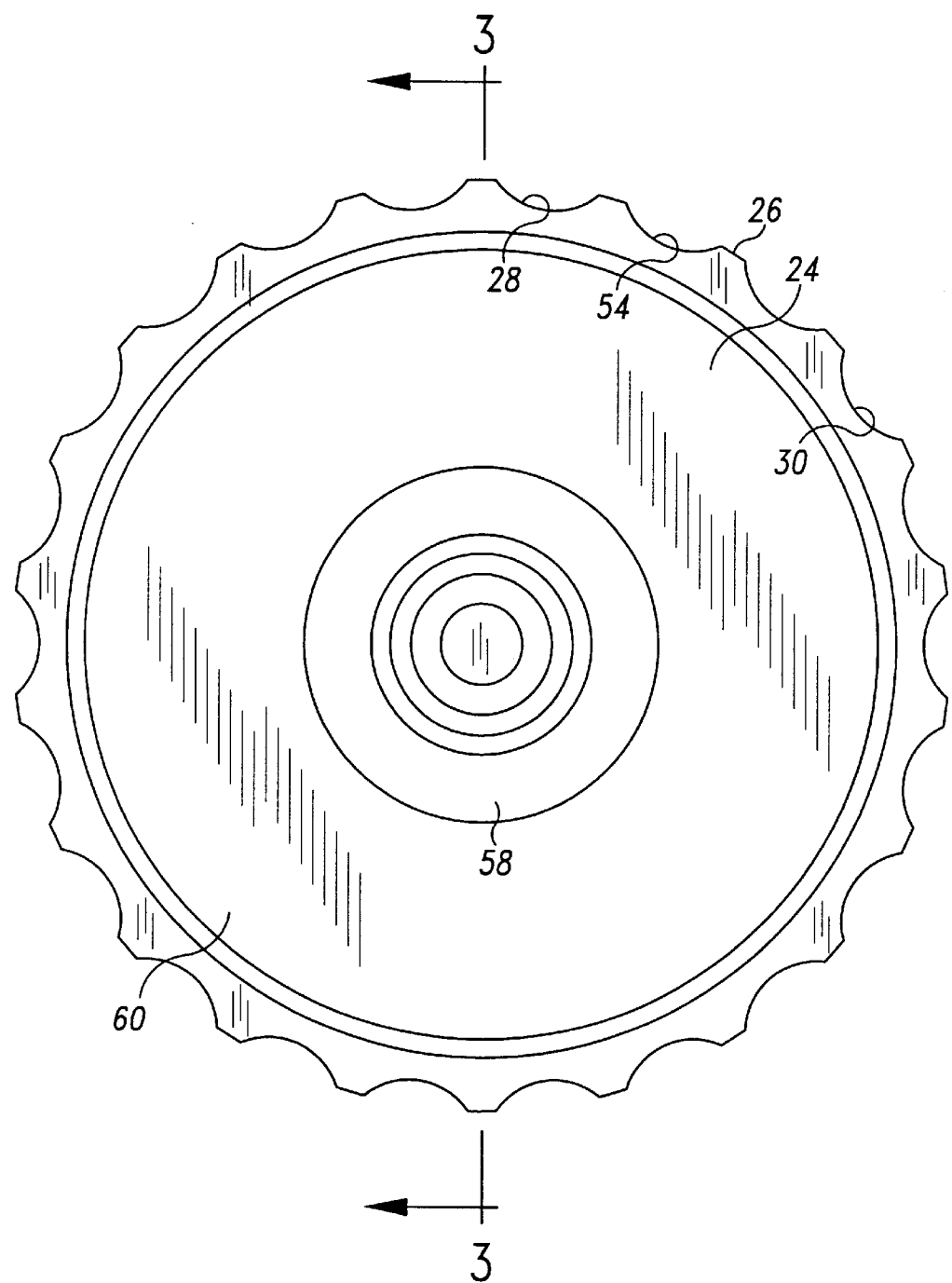
FIG. 2 is a side elevational view of an idler wheel of the work machine shown in FIG. 1.
Figure 3:
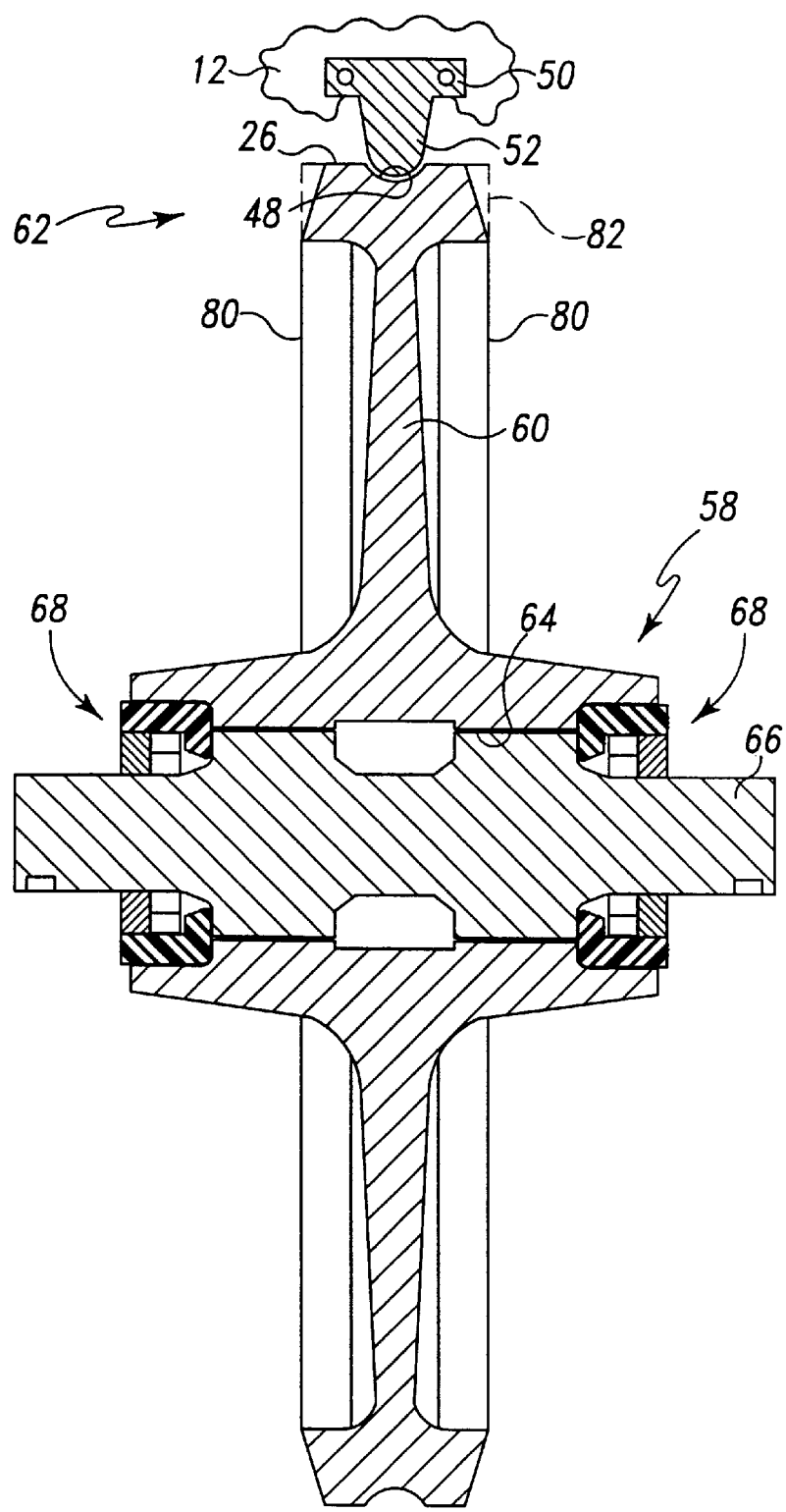
FIG. 3 is a cross sectional view of the idler wheel shown in FIG. 2 taken along the line 3—3 of FIG. 2 with a scraping device positioned within a circumferentially extending groove defined in the idler wheel.

As shown more clearly in FIGS. 2 and 3, idler wheel 24 includes a hub 58 having a passageway 64 defined therethrough. An axle 66 is positioned within passageway 64 along with a pair of sealing assemblies 68. Sealing assemblies 68 help keep a lubricant in passageway 64 while preventing dirt and other debris from entering passageway 64. Idler wheel 24 also includes a rim 60 attached to hub 58 so that rim 60 extends radially outwardly from hub 58. Axle 66 is mechanically coupled to frame 12 so that rim 60 and hub 58 are able to rotate relative to axle 66 and frame 12.

Figure 6:
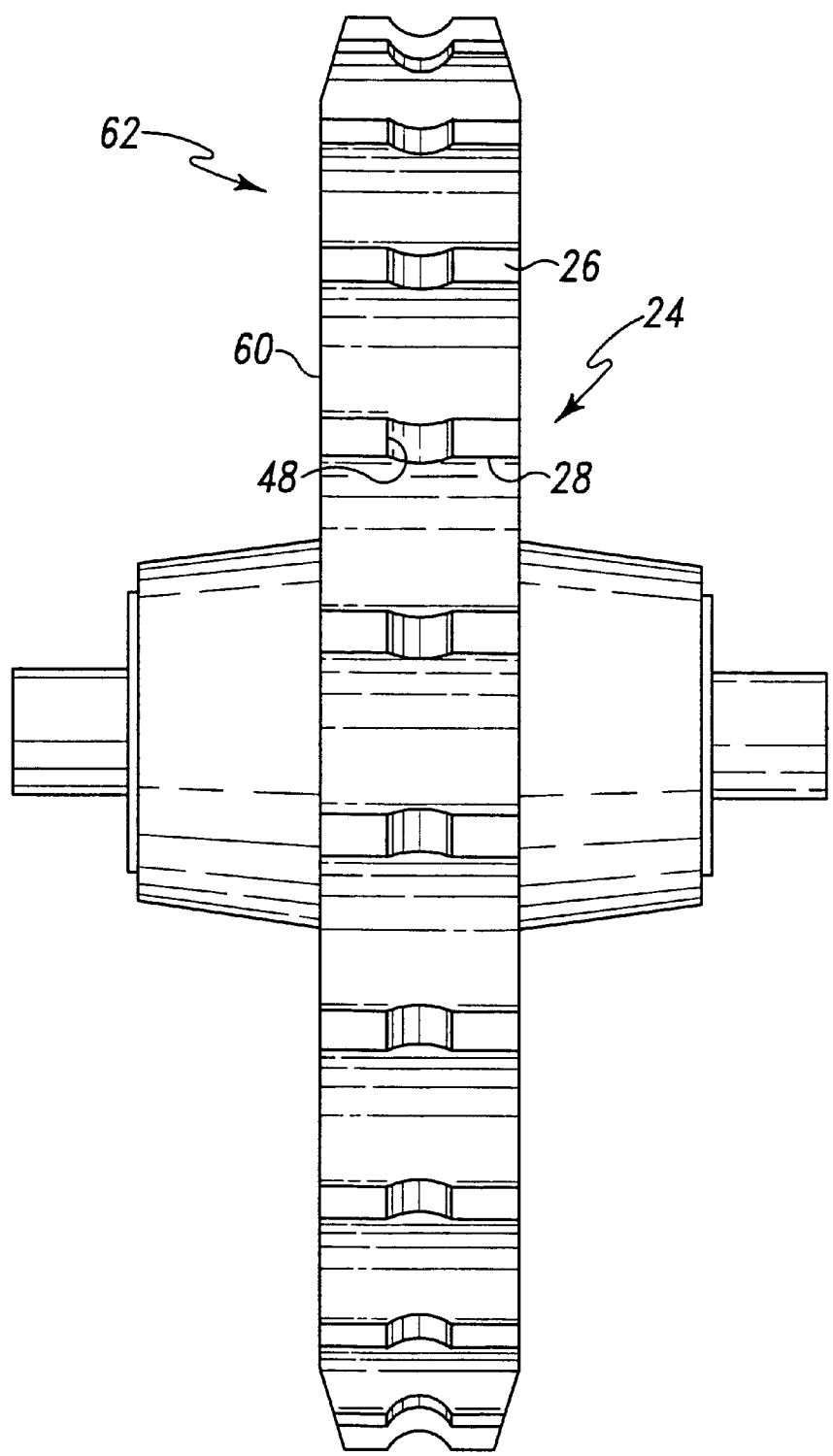
FIG. 6 is fragmentary view of the circumferentially extending surface of the idler wheel of FIG. 2.

An edge 62 of rim 60 has a circumferentially extending surface 26 defined thereon. Circumferentially extending surface 26 has a plurality of transverse notches defined therein. For example, circumferentially extending surface 26 has a notch 28, a notch 54, and a notch 30 defined therein. Moreover, as shown in FIGS. 3 and 6, circumferentially extending surface 26 has a circumferentially extending groove 48 defined therein. As shown in FIG. 3, scraping device 50 is secured to frame 12 so that a scraping end 52 of scraping device 50 is positioned within circumferentially extending groove 48. Having scraping end 52 positioned within circumferentially extending groove 48 facilitates the removal of debris, such as dirt, which collects in the transverse notches during the use of work machine 10. It should be appreciated that circumferentially extending surface 26 can be formed without circumferentially extending groove 48 and thus scraping device 50 is not needed.

Also, as shown in FIG. 3, rim 60 is configured such that wall segment 80 is angled inwardly near circumferentially extending surface 26. Note that wall segment 80 can also be configured so that it is not angled inwardly, rather it can be straight as shown by phantom lines 82.

Figure 5:
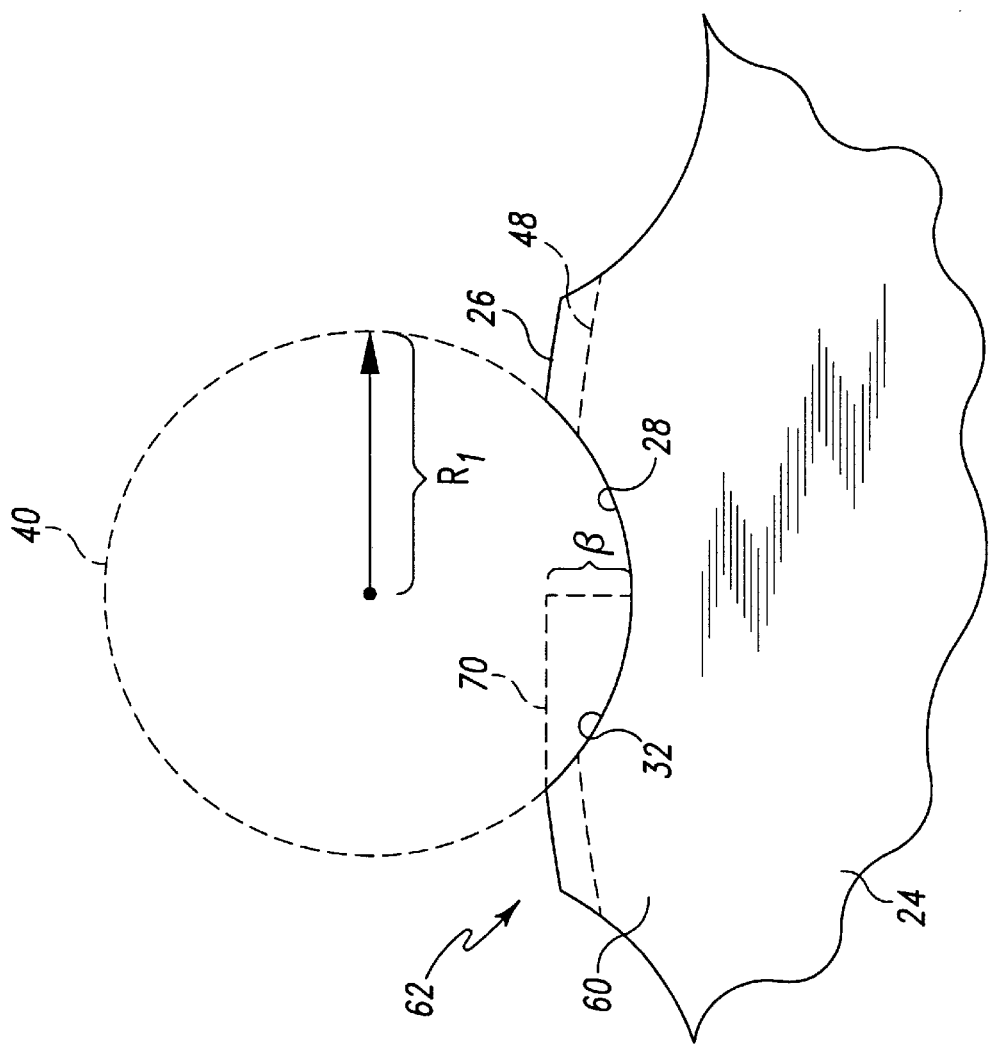
FIG. 5 is a view similar to that shown in FIG. 4 but showing a single bushing located within a notch defined in the idler wheel.

It should also be appreciated that all of the transverse notches defined in circumferentially extending surface 26 are substantially identical. Therefore, only the configuration of notch 28 will be described in detail herein. As shown in FIG. 5, notch 28 is defined by an arcuate wall portion 32.

Arcuate wall portion 32 defines a circle 40 having a radius $R_1$. Notch 28 also has a depth $\beta$. Depth $\beta$ is the distance between a linear extension 70 of circumferentially extending surface 26 and the deepest portion of notch 28.

Alternatively, notch 28 could be defined by a first arcuate wall, a second arcuate wall and a third arcuate wall interposed the first arcuate wall and the second arcuate wall. In this case the first arcuate wall defines a circle having a radius $R_3$, the second arcuate wall defines a circle having a radius $R_4$, and the third arcuate wall defines a circle having a radius $R_5$ where $R_5 > R_3 = R_4$.

Figure 4:
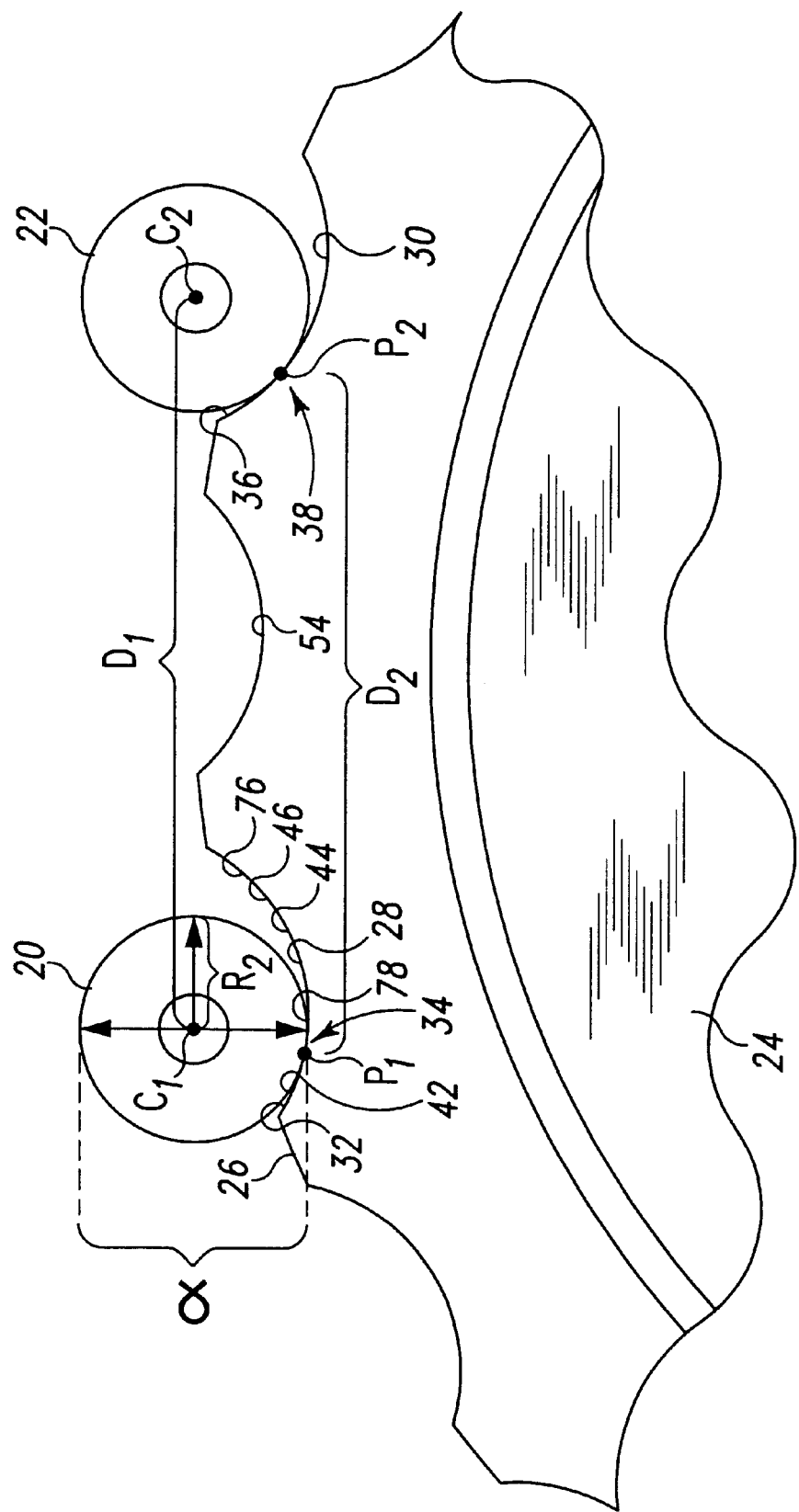
FIG. 4 is a side fragmentary view of the idler wheel of FIG. 2 showing a pair of bushings located within notches defined in the idler wheel.

With respect to the spatial relationship between notches 28, 54, and 30, as shown in FIG. 4, notch 54 is interposed notch 28 and notch 30. Furthermore, wall portion 32 of notch 28 has a point $P_1$ defined thereon at a location 34. Wall portion 36 of notch 30 has a point $P_2$ defined thereon at a location 38 which corresponds to location 34. What is meant herein by the phrase "which corresponds to location 34" is that point $P_2$ is positioned on wall portion 36 at substantially the same location as point $P_1$ is positioned on wall portion 32. Point $P_1$ is spaced apart from point $P_2$ by a distance $D_2$.

As shown in FIG. 1, track chain 56 includes a plurality of links 18 (note that some links 18 are shown in phantom in FIG. 1 while others are removed for clarity of description) that are interconnected by laterally disposed track pins, e.g. track pins 72 and 74. A cylindrical track bushing is concentrically disposed about each track pin for relative rotation with respect to the track pin. For example, a bushing 20 is concentrically disposed around track pin 72 which is in turn secured to a link 18. In addition, a bushing 22 is concentrically disposed around track pin 74 which is in turn secured to the same link 18 that track pin 72 is secured to. Positioning the bushings in the above-described manner mechanically couples the bushings to the track link so that the bushings can also rotate relative to the track link.

It should be appreciated that all the bushings included in track chain 56 are substantially identical, thus only the configuration of bushing 20 will be discussed in detail herein. Note that FIG. 4 shows an end view of bushings 20 and 22 with track pins 72 and 74, and link 18 removed for clarity of description. As shown in FIG. 4, bushing 20 has a diameter $\alpha$ and a radius $R_2$. Bushing 20 also has a center point $C_1$.

Still referring to FIG. 4, bushing 22 also has a center point $C_2$. When bushing 20 and bushing 22 are mechanically coupled to link 18, center point $C_1$ of bushing 20 is spaced apart from center point $C_2$ of bushing 22 by a distance $D_1$.

Referring to FIGS. 1 and 4, track chain 56 is positioned relative to idler wheel 24 so that a number of the transverse notches defined in idler wheel 24 have a bushing positioned therein. For example, as shown in FIG. 4, bushing 20 is positioned within notch 28 and bushing 22 is positioned within notch 30. Note that the center point $C_1$ of bushing 20 is spaced apart from the center point $C_2$ of bushing 22 by a distance $D_1$ such that when bushing 20 is positioned within notch 28 and bushing 22 is positioned within notch 30, notch 54 does not have a bushing positioned therein. Therefore, at any given time, the portion of idler wheel 24 which contacts track chain 56 will have a bushing in every other transverse notch defined in circumferentially extending surface 26. Further note that track chain 56 is positioned relative to idler wheel 24 so that idler wheel 24 is interposed the adjacent links of track chain 56. Having idler wheel 24 interposed the adjacent links of track chain 56 helps protect idler wheel 24 from being damaged by elements (e.g. rocks) present in the work environment of the track chain assembly.

Also note that as shown in FIG. 5, radius $R_1$ of circle 40 defined by arcuate wall portion 32 is greater than radius $R_2$ (see FIG. 4) of bushing 20. As shown in FIG. 4, when bushing 20 is located within notch 28 and positioned in contact with a first segment 42 of wall portion 32 having radius $R_1$ greater than radius $R_2$ results in a gap 44 being defined between bushing 20 and a second segment 46 of wall portion 32. Having a gap 44 defined between bushing 20 and second segment 46 of wall portion 32 is an advantage since gap 44 provides a certain amount of room for debris, such as dirt, to accumulate in notch 28 without affecting the ability of bushing 20 to seat appropriately therein. This is in contrast to other situations in which the "fit" of a bushing within a notch is relatively tight and therefore even a somewhat small amount of debris disposed within the notch can prevent the bushing from seating properly within the notch.

Still referring to FIG. 4, it should also be understood that that distance $D_1$ is greater than distance $D_2$. Having distance $D_1$ greater than distance $D_2$ is another advantage of the present invention since it ensures that when track chain 56 is advancing around idler wheel 24 and the bushings are initially advancing into the transverse notches, the bushings first contact a side ramp portion of the notch rather than contacting a bottom portion of the notch. For example, having $D_1$ greater than $D_2$ ensures that as bushing 20 is initially advancing into notch 28 bushing 20 first contacts a side ramp portion 76 of wall portion 32 rather than a bottom portion 78 of wall portion 32. Initially contacting side ramp portion 76 rather than bottom portion 78 reduces the impact force between bushing 20 and idler wheel 24 and thus decreases the noise resulting from the interaction of bushing 20 with idler wheel 24 during operation of work machine 10. Reducing the impact force between bushing 20 and idler wheel 24 in addition to the rotation of bushing 20 also decreases the wear on bushing 20 and idler wheel 24.

A further advantage of the present invention is that the diameter α of the bushings, e.g. bushing 20, is greater than the depth β (see FIG. 5) of the notches. In particular, it is preferred the depth β of the notches is substantially equal to about 25% of the diameter a of the bushings. Having the depth β of the notches substantially equal to about 25% of the diameter a of the bushings allows the bushings to more easily slip out of the notches and continue to rotate relative to idler wheel 24 if idler wheel 24 becomes locked, i.e. unable to rotate, during the use of work machine 10. The ability of the bushings to slip out of the notches when idler wheel 24 is locked allows track chain 56 to continue to rotate around a locked idler wheel 24 and thus provides an audible signal (e.g. as the bushings pass over the notches) to an operator of work machine 10 to alert the operator that work machine 10 should be shut down for maintenance.

Industrial Applicability

During use of work machine 10 track chain 56 engages a drive sprocket (not shown) that propels track chain 56 around a path of rotation defined by the sprocket and idler wheel 24. As track chain 56 engages idler wheel 24 the bushings, e.g. bushings 20 and 22, enter the transverse notches, e.g. notches 28 and 30, defined in idler wheel 24 in the above described manner as opposed to the idler wheel 24 coming into contact with links 18. Therefore, since the bushings can rotate relative to the links, and the bushings and the notches have complementary conformal surfaces, the wear on the idler wheel 24 and the links 18 of track chain 56 is significantly reduced as compared to arrangements where the generally planar surface of the wear rails come into contact with the arcuate idler wheel wear surface of the idler wheel.

Other aspects and features of the present invention can be obtained from a study of the drawings, the disclosure, and the appended claims.

What is claimed is:

1. An arrangement for supporting a track chain having a track link, a first bushing mechanically coupled to said track link, and a second bushing mechanically coupled to said track link, said first bushing has a first center point $C_1$ defined thereon, said second bushing has a second center point $C_2$ defined thereon, and said first center point $C_1$ is spaced apart from said second center point $C_2$ by a distance $D_1$, said arrangement comprising:

an idler wheel having a circumferentially extending surface defined thereon, wherein said circumferentially extending surface has a first substantially arcuate notch and a second substantially arcuate notch defined therein, said first notch has a first wall portion, said first wall portion has a first point $P_1$ defined thereon at a first location, said first notch has a first wall portion, said first wall portion has a first point $P_1$ defined thereon at a first location, said second notch has a second wall portion, said second wall portion has a second point $P_2$ defined thereon at a second location which corresponds to said first location, said point $P_1$ is spaced apart from said point $P_2$ by a distance $D_2$ and said distance $D_1$ is greater than said distance $D_2$.

2. The arrangement of claim 1, wherein:

said circumferentially extending surface has a third notch defined therein, and said third notch is interposed said first notch and said second notch.

3. The arrangement of claim 1, wherein:

said first wall portion has an arcuate shape such that said first wall portion defines a circle having a radius $R_1$, said first bushing has a radius $R_2$, and said radius $R_1$ is greater than said radius $R_2$ so that when said first bushing is located within said first notch and positioned in contact with a first segment of said first wall portion a gap is defined between said first bushing and a second segment of said first wall portion.

4. The arrangement of claim 1, wherein:

said first bushing has a diameter α, said first notch has a depth β, and said depth β is less than said diameter α.

5. The arrangement of claim 4, wherein:

said depth β is substantially equal to about 25% of said diameter α.

6. The arrangement of claim 1, wherein:

said circumferentially extending surface has a circumferentially extending groove defined therein.

7. The arrangement of claim 6, further comprising:

a scraping device having an scraping end defined thereon, wherein said scraping end is configured so that said scraping end can be disposed within said circumferentially extending groove.

8. A track chain assembly, comprising:

a track link;

a first bushing mechanically coupled to said track link, said first bushing has a first center point $C_1$ defined thereon;

a second bushing mechanically coupled to said track link, said second bushing has a second center point $C_2$ defined thereon, said first center point $C_1$ is spaced apart from said second center point $C_2$ by a distance $D_1$; and an idler wheel having a circumferentially extending surface defined thereon, wherein said circumferentially extending surface has a first substantially arcuate notch and a second substantially arcuate notch defined therein, said first bushing is positioned within said first notch, said second bushing is positioned within said second notch, said first notch has a first wall portion, said first wall portion has a first point $P_1$ defined thereon at a first location, said second notch has a second wall portion, said second wall portion has a second point $P_2$ defined thereon at a second location which corresponds to said first location, said point $P_1$ is spaced apart from said point $P_2$ by a distance $D_2$, and said distance $D_1$ is greater than said distance $D_2$.

9. The assembly of claim 8, wherein:

said circumferentially extending surface has a third notch defined therein, and said third notch is interposed said first notch and said second notch.

10. The assembly of claim 9, wherein:

said third notch does not have a bushing disposed therein.

11. The assembly of claim 8, wherein:

said first wall portion has an arcuate shape such that said first wall portion defines a circle having a radius $R_1$, said first bushing has a radius $R_2$, and said radius $R_1$ is greater than said radius $R_2$ so that when said first bushing is located within said first notch and positioned in contact with a first segment of said first wall portion a gap is defined between said first bushing and a second segment of said first wall portion.

12. The assembly of claim 8, wherein:

said first bushing has a diameter $\alpha$, said first notch has a depth $\beta$, and said depth $\beta$ is less than said diameter $\alpha$.

13. The assembly of claim 12, wherein:

said depth $\beta$ is substantially equal to about 25% of said diameter $\alpha$.

14. The assembly of claim 8, wherein:

said circumferentially extending surface has a circumferentially extending groove defined therein.

15. The assembly of claim 14, further comprising:

a scraping device having an scraping end defined thereon, wherein said scraping end is positioned within said circumferentially extending groove.

16. A track type work machine, comprising:

a frame a work implement mechanically coupled to said frame; and a track chain assembly mechanically coupled to said frame, said track chain assembly having (i) a track link, (ii) a first bushing mechanically coupled to said track link, said first bushing has a first center point $C_1$ defined thereon, (iii) a second bushing mechanically coupled to said track link said second bushing has a second center point $C_2$ defined thereon, said first center point $C_1$ is spaced apart from said second center point $C_2$ by a distance $D_1$, and point $C_1$ is spaced apart from said second center point $C_2$ by a distance $D_1$, and (iv) an idler wheel having a circumferentially extending surface defined thereon, wherein said circumferentially extending surface has a first substantially arcuate notch and a second substantially arcuate notch defined therein, said first bushing is positioned within said first notch, said second bushing is positioned within said second notch, said first notch has a first wall portion, said first wall portion has a first point $P_1$ defined thereon at a first locations said second notch has a second wall portion, said second wall portion has a second point $P_2$ defined thereon at a second location which corresponds to said first location, said first point $P_1$ is spaced apart from said second point $P_2$ by a distance $D_2$, and said distance $D_1$ is greater than said distance $D_2$.

17. The work machine of claim 16, wherein:

said first wall portion has an arcuate shape such that said first wall portion defines a circle having a radius $R_1$, said first bushing has a radius $R_2$, and said radius $R_1$ is greater than said radius $R_2$ so that when said first bushing is located within said first notch and positioned in contact with a first segment of said first wall portion a gap is defined between said first bushing and a second segment of said first wall portion.

18. The work machine of claim 16, wherein:

said first bushing has a diameter $\alpha$, said first notch has a depth $\beta$, and said depth $\beta$ is substantially equal to about 25% of said diameter $\alpha$.

19. The work machine of claim 16, wherein:

said circumferentially extending surface has a circumferentially extending groove defined therein.

20. The work machine of claim 19, further comprising:

a scraping device having an scraping end defined thereon, wherein said scraping end is positioned within said circumferentially extending groove.

* * * * *